United States Patent [19]

Sullivan

[11] Patent Number: 4,796,905
[45] Date of Patent: Jan. 10, 1989

[54] SPRAY-SUPPRESSANT SURFACE CONFIGURATION

[76] Inventor: Patrick F. Sullivan, 3645 Glen Oak, Eugene, Oreg. 97405

[21] Appl. No.: 926,142

[22] Filed: Oct. 31, 1986

Related U.S. Application Data

[63] Continuation-in-part of Ser. No. 794,306, Nov. 1, 1985, which is a continuation-in-part of Ser. No. 732,439, May 9, 1985, abandoned.

[30] Foreign Application Priority Data

| May 3, 1985 | [GB] | United Kingdom | 8511307 |
| Dec. 14, 1985 | [GB] | United Kingdom | 8530858 |
| May 2, 1986 | [EP] | European Pat. Off. | 86303379.1 |

[51] Int. Cl.⁴ .................................... B62D 25/16
[52] U.S. Cl. ............................ 280/154.5 R; D12/185
[58] Field of Search ............. 280/154.5 R, 153 R, 280/154.5 A; D12/185; 15/216, 215, 217, 238, 240

[56] References Cited

U.S. PATENT DOCUMENTS

| D. 11,972 | 9/1880 | Bourn | 15/215 |
| 3,285,624 | 11/1966 | Aber et al. | 280/154.5 R |
| 3,899,192 | 8/1975 | Reddaway | 280/154.5 R |
| 4,315,634 | 2/1982 | Arenhold | 280/154.5 R |
| 4,382,606 | 5/1983 | Lightle et al. | 280/154.5 R |
| 4,398,739 | 8/1983 | McKenzie et al. | 280/154.5 R |
| 4,420,180 | 12/1983 | DuPont et al. | 296/1 F |
| 4,564,204 | 1/1986 | Sullivan et al. | 280/154.5 R |

FOREIGN PATENT DOCUMENTS

| 3102805 | 9/1982 | Fed. Rep. of Germany | 280/154.5 R |
| 1101143 | 1/1968 | United Kingdom | 280/154.5 R |
| 2004823 | 1/1982 | United Kingdom | 280/154.5 R |
| 1022999 | 1/1984 | United Kingdom | . |
| 2132148 | 7/1984 | United Kingdom | 280/154.5 R |
| 2160835 | 1/1985 | United Kingdom | 280/154.5 R |
| 2143189 | 2/1985 | United Kingdom | 280/154.5 R |
| 2146598 | 4/1985 | United Kingdom | 280/154.5 R |

Primary Examiner—David M. Mitchell
Assistant Examiner—Eric Culbreth
Attorney, Agent, or Firm—Chernoff, Vilhauer, McClung & Stenzel

[57] ABSTRACT

A spray-suppressant flap for use behind the wheels of a highway vehicle has a laterally centrally located area including forwardly protruding laterally-extending bars, and laterally outwardly located vertically-extending areas including small forwardly protruding members arranged so as to divert liquid flowing laterally from between the bars to flow donwardly. The laterally extending bars slope downwardly from an upper end located nearer the center line of the vehicle toward a lower end located further from the center line of the vehicle when the flaps are installed behind the wheels of a vehicle. In one variation of the invention the bars are upwardly convexly arcuate. The area including the bars may extend from top to bottom, or only in an upper portion of the flap. Ridges may be provided between the bars to deflect spray toward forwardly-extending surfaces of the bars. An upper marginal portion of the flap may be of dovetail section, so as to fit in a V-shaped downardly-open channel to mount the flap. The pattern may be used for side skirts as well.

18 Claims, 5 Drawing Sheets

SPRAY-SUPPRESSANT SURFACE CONFIGURATION

This application is a continuation-in-part of co-pending patent application Ser. No. 794,306, filed Nov. 1, 1985, which is a continuation-in-part of U.S. patent application Ser. No. 732,439, filed May 9, 1985, now abandoned.

BACKGROUND OF THE INVENTION

The present invention relates to improvements in suppression of spray produced by wheeled vehicles moving upon highways, and particularly to a configuration for the surface of a spray-suppressant material for use behind and beside the wheels of a vehicle.

As a vehicle, for example a large truck, travels on a wet roadway surface, its wheels pick up liquids from the roadway surface. Such materials are thrown radially outwardly by the tires, forming spray. Such liquids may originate as rain water, slush from snow, melting ice, mud, and the like. When spray is thrown from vehicle tires against a solid surface on the vehicle it may be deflected or spattered into smaller droplets. As droplets rebound from solid surfaces on the vehicle they are likely to be caught in currents of turbulent air surrounding the vehicle. Such spray is carried in various directions, to be splashed against nearby vehicles, or to be suspended in the surrounding air as mist, producing annoying or dangerous conditions of poor visibility in the immediate vicinity of the vehicle.

Such splash and spray produced by a large moving vehicle is hazardous to other vehicles following or traveling alongside. It may impede the vision of the drivers of such other vehicles, or obscure the other vehicles from vision of the operator of the large vehicle causing the spray, leading to collisions between the vehicles.

With increasing numbers of vehicles present on the highways, and with highways having greater roadway width, the total amount of fluids likely to be present on the roadway surface and available to be thrown up into the air in the form of spray has increased. This makes the limitation of visibility by vehicle-produced spray an increasingly dangerous problem for drivers.

In order to reduce the amount of such splash and spray produced and thrown up in the way of other vehicles, large vehicles are required to have mud flaps hanging behind their wheels and to have spray-reducing side skirts in the vicinity of their wheels to collect and divert spray. Conventional mud flaps, however, have a relatively hard, generally planar front surface facing toward the wheels of a vehicle. Such a large planar surface generally merely deflects and splatters streams of impinging droplets thrown from the wheels of the vehicle, allowing most of such droplets and spray to continue to contribute to mist and spray in the turbulent air surrounding the vehicle.

An improved type of spray-reducing flap is disclosed in Reddaway U.S. Pat. No. 3,899,192, which teaches the provision of a plurality of elongate, resilient blade elements distributed over the surface of a flap. The blade elements project outwardly from the flap, extending generally toward the wheels of a vehicle in random, angular, crossing relationship to each other, to present a tangled mass of such blade elements for the purpose of absorbing and draining away fluid which strikes the flap.

Such a tangled mass of blade elements, however, has been found to retain mud, snow, and ice to an undesirable degree, and once appreciable amounts of mud or ice have been trapped in such a surface the flap has a much lower efficiency in limiting the amount of spray found in the vacinity of the wheels behind which such flaps are used.

A further improvement in spray-suppressant flaps is disclosed in Sullivan et al, U.S. patent application Ser. No. 526,436, filed Aug. 25, 1983, now U.S. Pat. No. 4,564,204. Such other publications as U.S. Pat. Nos. 4,382,606 and 4,398,739, U.K. Pat. No. 1,101,143 and U.K. pattent application Nos. 2 146 598A, 2 004 823B, 2 132 148A, and U.K. Design Registration No. 1,022,999 disclose other types of spray-reducing flap designs. However, greater spray suppression is still desired.

What is desired, then, is an improved spray-suppressant flap for use behind and alongside the wheels of a highway-operated vehicle to provide an improved amount of spray suppression at an economical cost. Preferably such a spray-suppressant flap should have an aesthetically pleasing appearance as well as the ability to entrap and divert downwardly a substantial part of the spray thrown against it from the wheels of a vehicle moving over a wet roadway.

SUMMARY OF THE INVENTION

The present invention provides a spray-reducing surface configuration for a flap behind or alongside a vehicle's wheels, in which a centrally located first area of a base surface of the flap includes forwardly protruding, generally horizontally extending parallel bars to catch fluid thrown or blown toward the front of the flap. Adjacent this central first area of the flap is a second area in which a pattern of smaller forwardly projecting elements is provided to receive spray emanating from the wheels and convert such spray into a downward flow of liquid along the base surface of the flap. The second area, adjacent the centrally-located bars, also receives lateral flow of liquid from between the ends of the bars, slowing the lateral movement of the liquid and allowing gravity and air currents along the flap surface to deflect the flow of the liquid toward a downward direction along the base surface of the flap.

The bars may be straight, extending horizontally, may slope laterally along the face of the flaps, or have downwardly sloping opposite end portions, or may be generally parallel curved bars which are upwardly convex, so that flow of liquid along and between the bars is directed downwardly and laterally outwardly by the bars.

In one embodiment of the invention, a low, forwardly-projecting ridge is provided in the space between adjacent ones of the bars so that droplets striking the sloping surfaces of the ridge are splashed toward the adjacent surfaces of the forwardly-projecting bars, rather than being splashed outwardly away from the flap. These ridges may extend the entire length of the parallel forwardly-projecting bars, or may extend only along the central portions of the bars, between the downwardly sloping opposite end portions.

The pattern of projections in a second area surrounding the area of the bars may be similar to that disclosed in the previously mentioned Sullivan et al, U.S. Pat. No. 4,564,204, or it may be a different pattern of short, narrow, arcuately curved diverting members or bars oriented diagonally on the base surface so as to slow and deflect laterally flowing liquid exiting from areas between bars downwardly along the surface of the flap.

A pattern of parallel downwardly-sloping rows of forwardly-extending flexible fingers may be provided between the ends of the forwardly-extending bars and the area of the flap including the pattern of projections similar to that disclosed in the previously-mentioned Sullivan et al. U.S. Pat. No. 4,564,204.

The spray-suppressant surface configuration of the side skirt 15 corresponds to that of the flap 12, and will therefore not be described separately.

A top margin of the flap of one embodiment of the invention includes a flared-out area which can be engaged by a downwardly open V-shaped support channel.

A lap joint extends horizontally along the face of one embodiment of the flap, permitting replacement of the bottom section of the flap and facilitating production of similar flaps of a standard width but different lengths.

It is therefore a primary object of the present invention to provide a surface configuration for a device such as a flap or skirt which has a central area with an improved capability to receive spray emanating from a moving vehicle, and to convert the spray into a relatively confined fluid stream.

It is another important object of the present invention to provide such a device which can be produced economically.

It is a further object of the present invention to provide a spray-suppressant device which is more easily and securely mounted than previously known flaps of this type.

It is an important feature of the present invention that it provides a spray-suppressing surface configuration including horizontal, parallel, spray-receiving bars in the area of the device expected to receive the highest incidence of spray, in combination with a pattern of projections in an area adjacent the parallel bars, for collecting additional spray and defining downwardly directed channels for the flow of liquid which has been caught between the bars and diverted laterally toward such channels.

It is another important feature of the spray-suppressant flap of the present invention that it includes a detachable, replaceable, bottom portion.

It is a principle advantage of the spray-suppressant flap configuration according to the present invention that it suppresses a greater percentage of spray than previously known flaps.

It is another important advantage of the present invention that it is not only effective, but economical to produce and aesthetically pleasant in appearance.

The foregoing and other objectives, features and advantages of the present invention will be more readily understood upon consideration of the following detailed description of the invention taken in conjunction with the accompanying drawings.

DETAILED DESCRIPTION OF THE INVENTION

Figures 1, 3:
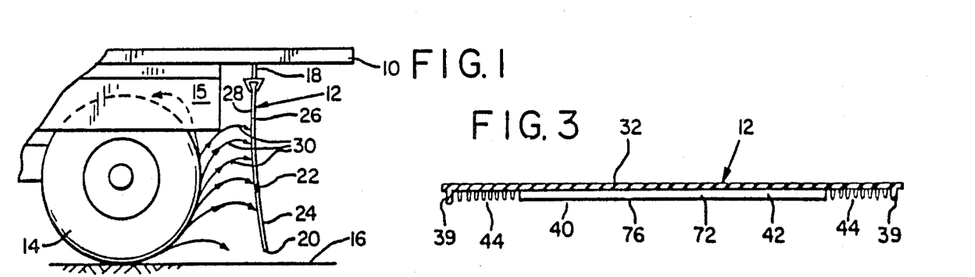
FIG. 1 shows a rear portion of a truck equipped with a spray-suppressant flap constructed according to the present invention.
FIG. 3 is a sectional view of the mud flap shown in FIG. 2, taken along line 3—3.

Referring now to the drawings, in FIG. 1 a truck 10 is equipped with a vertically hanging spray-suppressant flap 12 located rearwardly from its wheels 14, and a similar side skirt 15 located alongside its wheels 14, to receive and coalesce fluid droplets thrown from the wheels 14 or other surfaces as the truck 10 moves on a wet roadway surface 16. The flaps 12 are suspended from hangers 18 which are fixedly mounted on the truck 10, and extend downwardly to a bottom 20 of the flap spaced a short distance above the road surface 16. The bottom 20 may, for example, be within four to six inches above the road surface 16. Preferably, the flap 12 of material embodying the present invention may be molded of a flexible material such as a synthetic rubber. For the sake of convenience and because of size limitations of available molds, it may be desirable to provide a horizontally-extending lap joint 22 to fasten a lower portion 24 to an upper portion 26 of the flap 12.

As the truck 10 moves along a highway, a majority of spray droplets thrown from the wheels 14 typically strikes against the front side 28 of the flap 12 above mid-height, traveling along paths similar to those indicated by the arrows 30.

Referring now to FIGS. 2–7, a flap 12 according to the present invention includes a base sheet 32 thick enough to be suitably rigid and heavy. As shown in the FIG. 2, the base sheet 32 includes a top margin 34 and lateral margins 36, and a generally flat base surface 38 on the front side 28 of the flap 12, which ordinarily faces toward the wheels 14. Raised ribs 39 are provided in the lateral margins 36, extending generally vertically along the flap 12. Each rib 39 has a rounded front edge and a height of about ⅝ inch (1.6 cm) as shown in FIG. 3. The ribs 39 add stiffness to the base sheet 32, should it be made of a very flexible material, and serve to constrain the flow of liquid downward along the base surface 38, as will be explained more fully subsequently.

Figure 2:
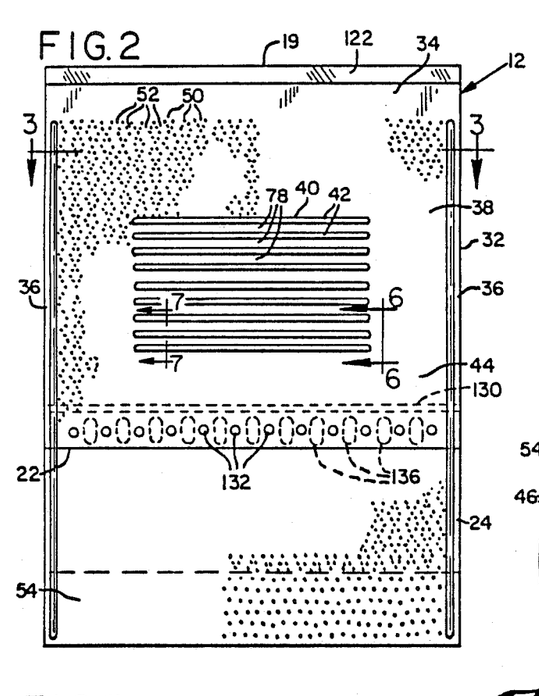
FIG. 2 is a front elevational view of the spray-suppressant mud flap shown in FIG. 1.

The base sheet includes a spray-suppressing first area 40 located where the heaviest incidence of liquid droplets is expected to be received. This location, then, for a normal flap installation, is a laterally central one, and closer to the top 19 of the flap 12 than to its bottom 20. The first spray-suppressing area 40 includes a group of parallel, laterally-extending, forwardly projecting bars 42 molded integrally with the base sheet 32 of the flap 12 and of the same material. The bars 42 are provided for the purpose of initially catching and coalescing the impinging drops of spray and conducting the liquid laterally toward the lateral margins 36. A vertical spacing 43 between corresponding parts of adjacent bars 42 is preferably about 0.75 inch (1.9 cm), although a spacing 43 in the range of 0.5 inch to 1.0 inch (1.3–2.5 cm) could be used.

Surrounding the first area 40 is a spray-suppressant second area 44 of the flap 12. The second area 44 includes a plurality of upstanding flexible fingers 46 extending from the base surface 38 and distributed over the second area 44, preferably being arranged in a pattern such as that shown in FIG. 4. Such a pattern consists of a plurality of diamond-shaped rhombic groups 48, each including eight flexible fingers 46. Vertically adjacent ones of the diamond-shaped groups 48 overlap one another, so that one finger 46 is at the end of each of two adjacent groups 48. (The pattern of the groups 48 may also be thought of as single fingers 46 located between vertically adjacent hexagonal groups of six fingers 46.) The adjacent overlapping rhombic groups 48 of fingers 46 are arranged as parallel rows 50 of groups 48. The rows 50 define channels 52 along the base surface 38 between the rows 50, the groups 48 in each row 50 being offset longitudinally with respect to the groups 48 in adjacent rows 50 so that the channels 52 are of a zig-zag, rather than straight, configuration, as may be seen in FIG. 4. The channels 52 extend generally vertically so as to conduct a flow of liquid downwardly along the spray-suppressing second area 44 of the base sheet 32 when it is hanging as shown in FIG. 1, suspended by attachment of the top margin 34 to the truck 10.

A spray-suppressant third, or lower marginal, area 54 of the forward side 28 includes a pattern of fingers 46 on the base surface 38 which is more open than that in the second area 44, giving additional unobstructed area of the base surface 38 between the fingers 46. Such a third area 54 may extend over the bottom 3 inches (7.6 cm) of the flap 12, for example, and is provided in order to enhance shedding of snow or ice where its accumulation is otherwise likely to be heaviest.

Figure 4:
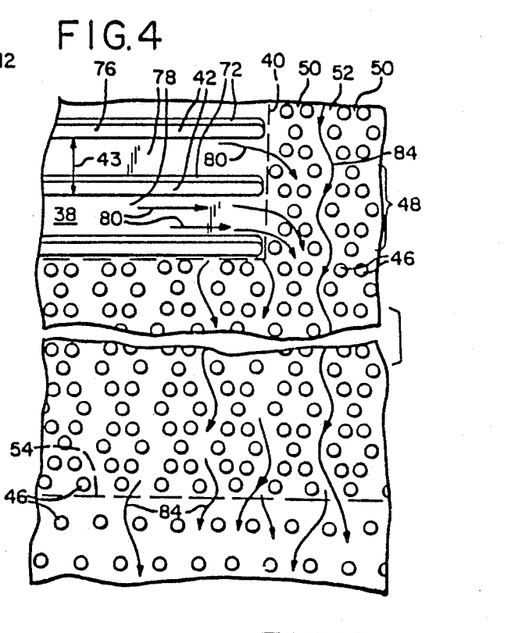
FIG. 4 is a detail view of a portion of the spray-suppressant flap shown in FIG. 2, at an enlarged scale.
Figure 5:
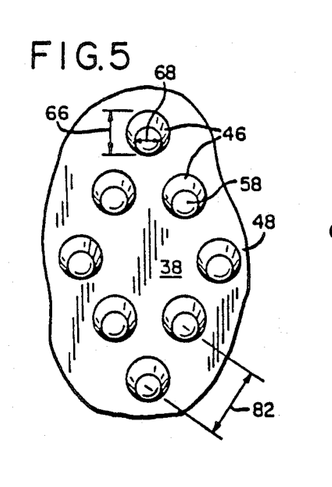
FIG. 5 is a detail view of the portion of a spray-suppressant flap shown in FIG. 4, at a further enlarged scale.
Figure 6:
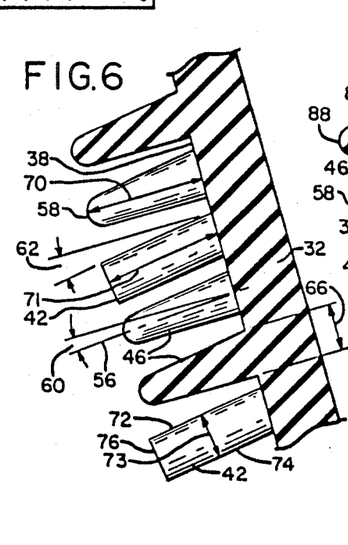
FIG. 6 is a sectional side view, taken along line 6—6, of the portion of a spray-suppressant flap shown in FIG. 4, at an enlarged scale.

Referring now to FIGS. 4, 5, and 6, it will be appreciated that the bars 42 and the individual fingers 46 are inclined, although parallel with one another, at an angle of a few degrees away from being perpendicular to the generally planar base surface 38 of the base sheet 32 of the flap 12. The fingers 46 are tapered and generally circular in cross section. Each has a central axis 56 and a generally frusto-conical outer surface with a hemispherical tip 58. Ordinarily, the fingers 46 are inclined slightly downward from the perpendicular, so that the central axis 56 of each finger 46 extends at an angle 60 of about 2°–15° below the horizontal, when the flap 12 is hanging vertically. For example, the central axis 56 of each finger is preferably about 4° below the horizontal when the flap 12 is hanging vertically. The frusto-conical outer surface of each finger defines an angle of about 4° relative to the central axis 56, resulting in the uppermost surface of each finger preferably being inclined at an angle 62 of approximately 8° below horizontal, while the lowermost surface is approximately horizontal.

Each finger 46 is tapered, for example, from a diameter 66 (at its base) of approximately 3/16 inch (0.47 cm) to a tip diameter 68 of approximately ⅛ inch (0.3175 cm), with the tip 58 being generally hemispherical. Each finger 46 has a length 70 which is preferably at least about 2-½ times as great as its diameter at its base, so that it is independently flexible along its length 70, in order to promote shedding of ice and provide additional surface area beyond that of a conventional flat flap of the same size as the flap 12. For example, the fingers 46 may preferably be about ½ inch (1.3 cm) in length. The flexibility provided in this construction permits the fingers 46 individually to absorb some of the kinetic energy of fluid droplets thrown toward the flap 12, contributing to reduction of the amount of spray associated with a vehicle 10 equipped with flaps 12.

The bars 42 are, in one preferred embodiment of the invention, generally rectangular in cross section and have a forwardly-projecting width 71 of about ½ inch (1.3 cm), and a thickness 73 of about 3/16 inch (0.47 cm), as may be seen best in FIG. 6. FIG. 6 shows, in section, a portion of the flap 12 sloped as it might be if rearwardly deflected by the relative wind generated by the vehicle 10 moving forward. Each bar 42 has an upper surface 72 and a lower surface 74 which are parallel with each other. A front edge surface 76 is perpendicular to the upper surface 72, and the bars 42 are downwardly sloped, parallel with the central axes 56 of the fingers 46. This configuration provides horizontal channels 78 between adjacent bars 42. Spray received against the spray-suppressant first area 40 of the flap 12 is initially caught between the bars 42 and can flow laterally through the horizontal channels 78 between bars 42 toward the lateral margins 36. As the liquid exits from the channels 78 it encounters the groups 48 of fingers 46 in the portion of the second area 44 adjacent the ends of the bars 42. The groups 48 of the fingers 46 slow the lateral movement of liquid and permit it to be diverted by gravity and wind as indicated by the arrows 80, to flow downwardly through the open channels 52.

The distance 82 between the central axes 56 of the closest adjacent fingers 46 within each group 48 is preferably about ¼ inch (0.6 cm), giving each rhombic, or diamond-shaped, group 48 a width of ½ inch (1.3 cm)

between the central axes 56 of the opposite corner fingers 46, and each channel 52 preferably has the same width. Thus, less than half of the second area 44 of the flat base surface 38 is occupied by the fingers 46. However, spray droplets impinging upon the spray-suppressant second area 44 of the base sheet 32 are likely to encounter the surface of one of the fingers 46 initially, or to rebound against one of the fingers 46 if they first impinge upon a portion of the flat base surface 38. Such droplets will thereafter coalesce and be blown or drawn by gravity into one of the channels 52 and drain downward along the channels 52 in the direction indicated by the arrows 84. The fluid can then drain from the lower margin of the flap 12 with a reduced likelihood of being suspended in the air as spray or mist.

When the vehicle 10 is moving forward, creating a considerable amount of relative wind against the front side 28 of the flap 12, the flap 12 is deflected as shown in FIG. 6 into a rearwardly and downwardly sloping attitude. As a result, the bars 42 and fingers 46 are then more steeply downwardly inclined than when the flap 12 is hanging vertically, presenting more of the surface of the bars 42 and fingers 46 across the predominant paths of movement, indicated by arrows 30, of spray droplets toward the flap 12. Most such fluid impinging on the first area 40 is caught between the bars 42 and then deflected or blown laterally through the channels 78 toward the groups 48 of fingers 46. Spray impinging on the second area 44, when it encounters the fingers 46, flows along the surfaces of the fingers 46 until it reaches the flat base surface 38 and can thereafter drain downwardly through the channels 52. The lateral margins 36 also act as channels for flow along the inwardly facing sides of the vertical ribs 39.

Figure 7:
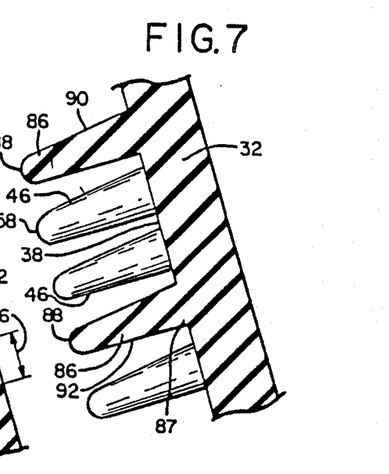
FIG. 7 is a view similar to that of FIG. 6, taken along line 7—7, showing a flap which is a variation of that shown in FIG. 2.

As is shown in FIG. 7, the first area 40 may include bars 86 which, instead of having the rectangular cross section of the bars 42, are tapered from a broad base 87 to a rounded edge 88, so that the profile of the bars 86 is the same as that of the fingers 46. Upper surfaces 90 of the bars 86 are parallel with the uppermost surfaces of the fingers 46, and lower surfaces 92 are parallel with the lowest surface of fingers 46.

Figures 8, 9, 10, 11:
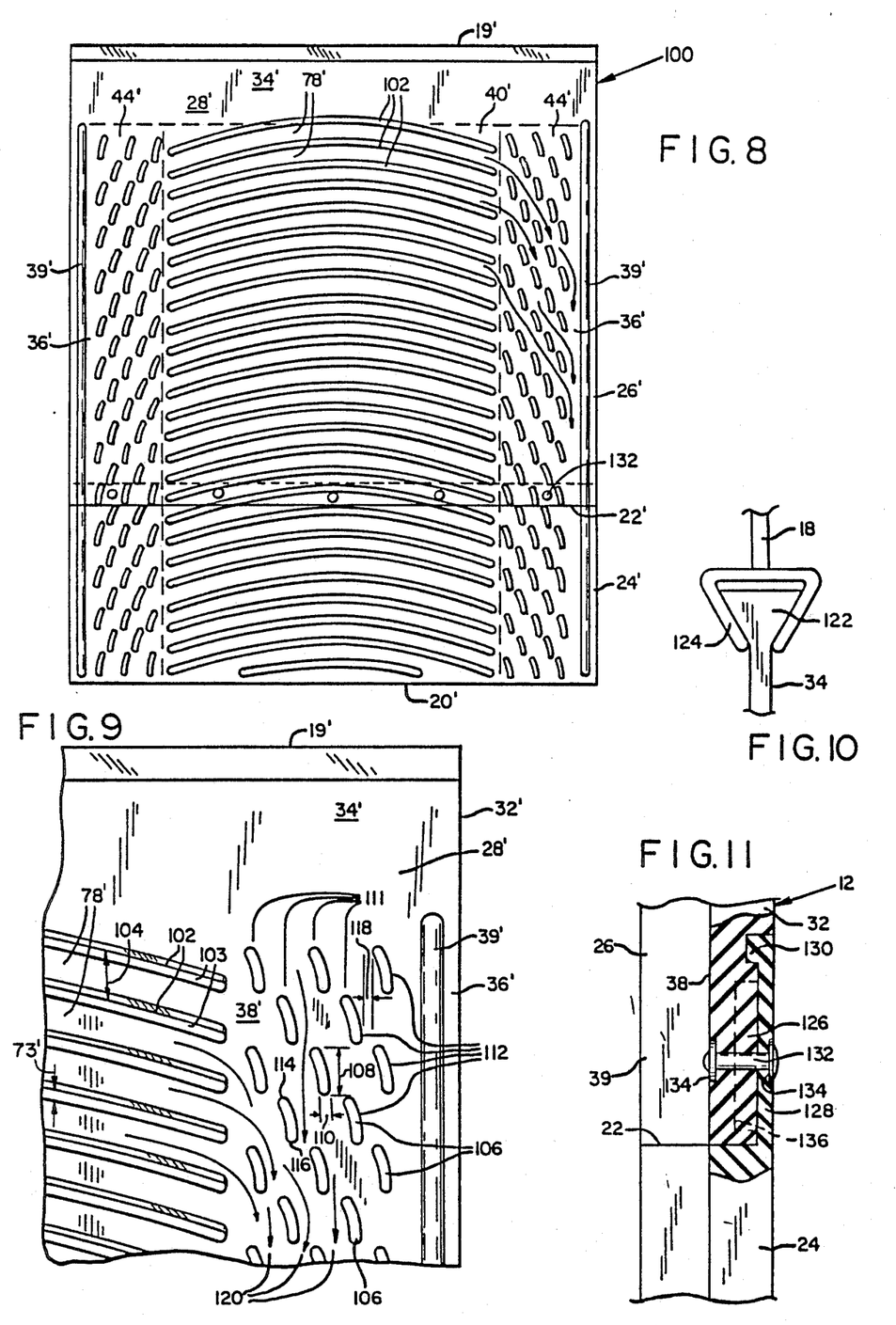
FIG. 8 is a front elevational view of a spray-suppressant flap which is an alternative embodiment of the present invention.
FIG. 9 is a view of a portion of the flap shown in FIG. 8, at an enlarged scale.
FIG. 10 is a side elevational view of an upper marginal portion of the flap shown in FIG. 2.
FIG. 11 is a side elevational view of a portion of the flap shown in FIG. 2, at an enlarged scale, showing a lap joint between portions of the flap.

Referring now to FIGS. 8 and 9, a flap 100 which is an alternative embodiment of the invention is generally similar to the flap 12, having a top 19', a bottom 20', a lap joint 22', a lower portion 24', an upper portion 26', and a front side 28'. A base sheet 32' includes a top margin portion 34' and lateral margins 36' of a base surface 38'. Ribs 39' are located along lateral margins 36'.

A first spray-suppressant area 40' includes bars 102, which are upwardly convexly arcuate along their lengths. The bars 102 have a radius of curvature in which they extend generally horizontally although their lateral ends are downwardly inclined by, for example, 20°–30°, and preferably 25°. The first area 40' extends laterally across a central region of the front side 28'. The bars 102 may have the rectangular profile of the bars 42, or the tapered profile of the bars 86, and like the bars 42 and 86, are inclined slightly downward toward their leading or front edge 103. Corresponding points on the bars 102 are spaced vertically apart from one another by a spacing distance 104 of about ¾ inch (1.9 cm), defining arcuate channels 78' for collecting and directing spray laterally. While other spacing distances 104 might be useable, for example, spacings within the range of 0.5–1.0 inch (1.3–2.5 cm), the ¾-inch distance is preferrd. The first spray-suppressant area 40' may extend over the full height of the flap from the top margin 34' to the bottom 20' of the flap 100. A second spray-suppressant area 44' is located adjacent the first area 40', extending as a vertically-oriented rectangle located between the first area 40' and the respective lateral margin 36' on each side. Within the second area 44' elongate, forwardly-projecting diverter members 106 are aligned in a pattern as shown in FIG. 9. Each diverter member 106 is elongate and preferably arcuate, as seen in front view, with its length oriented diagonally on the base surface 38'. Each of the diverter members 106 has a height 108 approximately equal to the distance 104 between consecutive ones of the bars 102 and a width 110 approximately equal to the thickness 73' of each of the bars 102 adjacent the base surface 38'. The diverter members 106 are aligned in a regular pattern of vertical rows 111 and horizontal rows 112, with the individual diverter members 106 of vertically adjacent horizontal rows 112 being staggered laterally. Each of the diverter members 106 is oriented diagonally with an upper end 114 being farther than its lower end 116 from the nearest lateral margin 36'. The lateral spacing 118 between adjacent ones of the diverter members 106 in each row 112 is sufficient that open channels 120 extending vertically are defined between the vertical rows of diverter members 106. Thus spray which impacts against the first area 40' is diverted laterally outwardly and downwardly toward the second area 44' in which the diagonally oriented diverter members 106 further divert the flow of spray toward a diagonally downward and outward direction and thence into the vertical, downwardly-extending channels 120 leading toward the roadway 16.

Referring to FIG. 10, to faciliate attaching the flaps 12 to the truck 10, the top margin 34 is free from forward projections and includes an outwardly flared retaining edge 122 in the form of a dovetail. The retaining edge 122 may then be received by sliding the flap laterally with the retaining edge 122 within a downwardly open V-shaped channel 124 fixedly mounted on the truck 10. Fasteners (not shown) may then be used to close an exposed end of the channel 124 to prevent the flap 12 from sliding laterally out of the channel 124.

As shown in FIG. 11, the lap joint 22 is a scraf joint in which a lower rear marginal portion 126 extends rearwardly from a back side of the upper portion 26 of the flap 12, and an upper rear portion 128 extends upwardly from the lower portion 24, and includes a forwardly extending finger strip 130 which fits above the lower rear marginal portion 126. Fasteners such as small bolts or rivets 132 may be spaced apart from one another at intervals along the joint 122 to hold the upper and lower portions of the flap together. Reinforcement may be provided by metal washers 134 molded into place and by interlocking vertically oriented elongate projections 136 on the front side of the upper rear portion 128 and cavities in the rear side of the lower rear marginal portion 126 which matingly receive the projections 136 to provide stiffening support for the lower portion 24. This joint makes replacement of the lower portion 24 of a flap 12 a simple matter, should it be damaged as may occur in backing the truck 10 over a high curb.

Referring now also to FIGS. 12–15, a spray-suppressant flap 150 is yet another alternative embodiment of the present invention. As does the flap 12, the flap 150 includes a base sheet 152 similar to the base sheet 32. The base sheet 152 includes a top margin 154, lateral margins 156, and a generally flat base surface 158 on the front side of the flap 150, which ordinarily faces toward the wheels of a vehicle on which the flap is mounted. Raised ribs 160 are provided in the lateral margins 156 and are similar to the ribs 39 of the flap 12.

Figure 12:
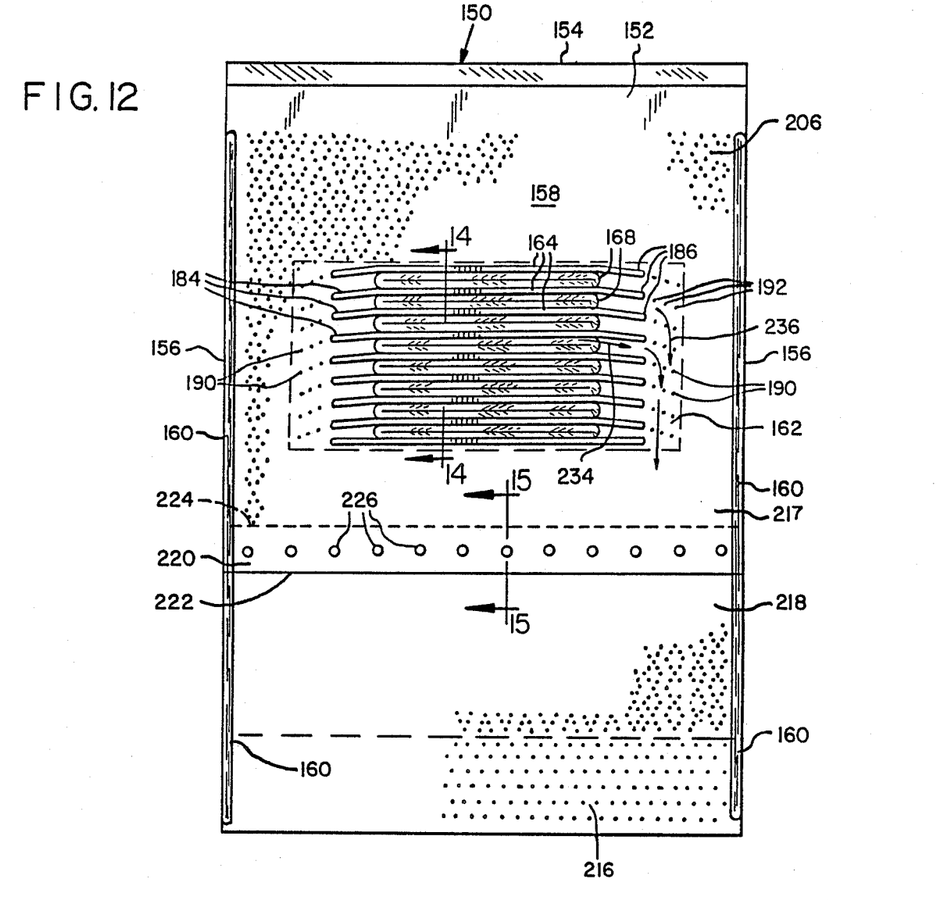
FIG. 12 is a front elevational view of a spray-suppressant flap which is a second alternative embodiment of the present invention.

A spray-suppressing first area 162 corresponds generally with the first area 40 of the flap 12, and includes a group of parallel, laterally-extending, forwardly-projecting bars 164 molded integrally with the base sheet 152. The bars 164 extend laterally over a majority of the width of the flap 150, and corresponding parts of adjacent bars 164 are separated vertically by a spacing 166 which is preferably about 0.75 inch (1.9 cm), although a spacing 166 in the range of 0.5 inch to 1.0 inch (1.3–2.5 cm) could be used.

Between adjacent ones of the bars 164 are laterally-extending, forwardly-projecting ridges 168, which project forward a significantly smaller distance than do the bars 164. The ridges 168 extend laterally along the base surface 158 over a distance of more than half the length of the bars 164, and preferably greater than one third of the width of the flap 150. Each ridge 168 preferably projects forwardly from the base surface 158 a distance 170 of approximately ⅛ inch (0.3 cm) and is centrally located between the bars 164 above and below it. Each ridge 168 includes sloping surfaces 172 and 174 which form respective interior angles 176 and 178 with the adjacent bottom surface 180 and top surface 182 of the adjacent bars 164. The bars 164 extend forwardly generally perpendicular to the base sheet 152, with their top surfaces 182 and bottom surfaces 180 preferably substantially parallel with one another. The angles 176 and 178 are preferably equal and in the range of about 65°–80°, an angle of 72° having been found to be particularly effective.

Figure 13:
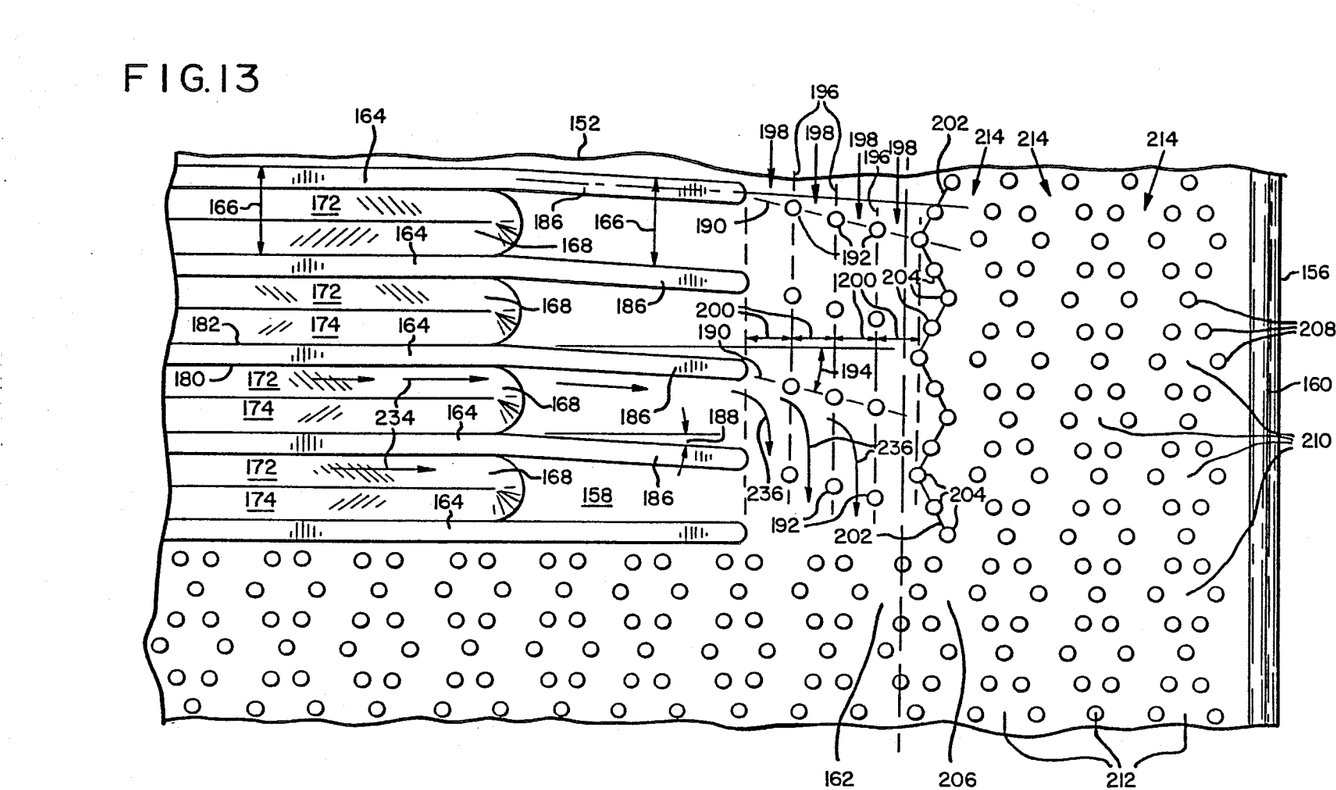
FIG. 13 is a front elevational view of a portion of the flap shown in FIG. 12, at an enlarged scale.

Each of the bars 164 also includes a pair of opposite end portions 184 and 186, each about 1½ inches (2.8 cm) long, which extend laterally beyond the ends of the ridges 168 at a downward slope as seen in FIGS. 12 and 13, defining an angle 188 with the central horizontal part of the respective bar 164 of less than 5° and, preferably, equal to about 3° (FIG. 13). Aligned with each of the end portions 186 of the bars 164 is an outwardly and downwardly sloping row 190 of forwardly projecting fingers 192 essentially similar to the fingers 46, a broken line being used in FIG. 13 to indicate a row 190. Each row 190 extends downwardly at an angle 194 of slope with respect to the horizontal central portions of the bars which is greater than the angle 188. For example, the angle 194 may be in the range from 6°–16°, and is preferably about 11°. Each row 190 includes two or three fingers 192, with the use of three fingers 192 being preferred when the length of the bars 164 is greater than, for example, about 12 inches (30.5 cm)

Individual fingers 192 of adjacent rows 190 are located vertically in line with one another, forming vertical rows 196 and vertical channels 198 on the base surface 158. The channels 198 are defined by a lateral spacing 200 between corresponding parts of fingers 192 forming the several vertical rows 196. This lateral spacing 200 is, for example, about 0.35 inch (0.9 cm).

A zig-zag, vertically oriented row 202 of forwardly-extending flexible fingers 204, which are also essentially similar to the fingers 46 of the flap 12, is located along the ends of the rows 190 separated from the end portions 184 and 186 of the bars 164. The fingers 204 are spaced apart from one another by a distance, preferably, of ¼ inch (0.6 cm), between corresponding parts of adjacent fingers 204.

Spaced laterally outward from the row 202, within a spray-suppressing second area 206 of the base sheet 152 (corresponding with the second area 44 of the flap 12) are a plurality of fowardly-extending flexible fingers 208, essentially similar to the fingers 46 of the flap 12 and arranged in a similar pattern consisting of a plurality of rhombic groups 210 similar to the rhombic groups 48 of the flap 12. The groups 210 are arranged in parallel, generally vertical rows 212, with adjacent vertical rows 212 being vertically offset to form zig-zag channels 214 extending generally vertically along the base surface 158, so as to conduct a flow of liquid downwardly along the base surface 158 within the spray-suppressing second area 206. While the fingers 208 are shown extending substantially perpendicularly from the base surface 158, it is clear that they, and the fingers 192 and 204, might all also be downwardly inclined as are the fingers 46 of the flap 12 previously described.

A spray-suppressant third, or lower marginal, area 216 of the flap 150 corresponds with the area 54 of the flap 12, and, similarly, includes fingers 208 which are more widely separated than those in the rhombic groups 210.

To provide the maximum spray suppression, the flap 150 will ordinarily be mounted on a vehicle so that its lower end extends close to the ground when a vehicle is normally loaded. This will result in wear of the lower margin as it is stuck by gravel and other material along a roadway. In order to permit repair of the flap 150, the base sheet 152 may include an upper portion 217 and a lower portion 218 interconnected with one another by a lap joint 220, shown in FIGS. 12 and 15. Preferably the overlapping portion 222 of the upper portion 216 is substantially thicker than the upwardly extending overlapping portion 224 of the lower portion 218, so that the lower portion 218 will be more likely to pull away from the upper portion 217 without damaging the upper portion 217 thereby. A plurality of generally conical portions 226 molded to extend forwardly from the overlapping portions 222 define bores 228, and corresponding holes 230 are provided in the overlapping portion 225 of the lower portion 218 to receive fasteners such as threaded screws 232. The screws 232 fit tightly in the bores 228 and preferably are equipped with round heads having hexagonal sockets (Allen Sockets), by means of which the screws 232 may be fastened into the bores 228 to attach the lower portion 218 to the upper portion 217. The holes 230 may be larger in diameter than the bores 228, providing a somewhat looser fit around the screws 232 than that provided within the bores 228, to enhance the ability of the lower portion 218 to separate from the upper portion 217 without damaging the upper portion 217, thus making it possible to replace the lower portion 218 and thereby restore the flap 150 to a satisfactory condition. Thus, when a vehicle equipped with the flap 150 is backed over a curb, pinching the lower portion 218 between a wheel and the curb, the lower portion 218 may be torn away from the upper portion 217 without damaging the upper portion 217. For the same reason, the bores 228 and holes 230 are preferably located in the upper third of the overlapping areas 222 and 224.

The flap 150 described in the preceding paragraphs performs similarly to the flap 12, but has the capacity for superior suppression of spray by virtue of the deflection of spray from the sloping surfaces 172 and 174 of the ridges 168 onto the surfaces 180 and 182 of the bars 164. This results in a greater quantity of spray being diverted to flow laterally as indicated by the arrows 234. As such laterally moving liquid encounters the downwardly sloping opposite end portions 184 and 186 at the respective ends of the bars 164 it is diverted downwardly and, upon reaching the extreme ends of the downwardly sloping end portions 184 and 186 the liquid is free to flow downwardly along the base surface 158 through the channels 198, as indicated by the arrows 236. The downward slope of the row 190 of fingers 192 helps to turn the flow indicated by the arrows 234 to the downward direction indicated by the arrows 236, while the lateral spacing 200 provides sufficient capacity within the channels 198 to accommodate downward flow of the liquid diverted into the channels 198. This enhances the ability of the pattern of bars 164 and ridges 168 to carry away spray which impinges upon the first area 162 of the flap 150, because of the location of the first area 162 where it receives the greatest volume of water from the wheels of a vehicle equipped with the flap 150.

Referring now also to FIGS. 16-21, a spray-suppressant flap 250 is yet a further alternative embodiment of the present invention. The flap 250 includes a base sheet 252 similar to the base sheet 32 of the flap 12. The base sheet 252 includes a top margin 254, a laterally inward vertical margin 256, a laterally outward vertical margin 258, and a generally flat base surface 260 located on the front side of the flap 250, which ordinarily faces toward the wheels of a vehicle on which the flap is mounted. Preferably, a pair of laterally symmetrically opposite flaps are used on a vehicle, and the flap 250 is intended for use behind the wheels on the right-hand side of a vehicle. The flap 251, shown in FIG. 17, which is intended for use behind wheels on the left-hand side of a vehicle, is a variation of the flap 250 and will be described in greater detail subsequently.

Figure 16:
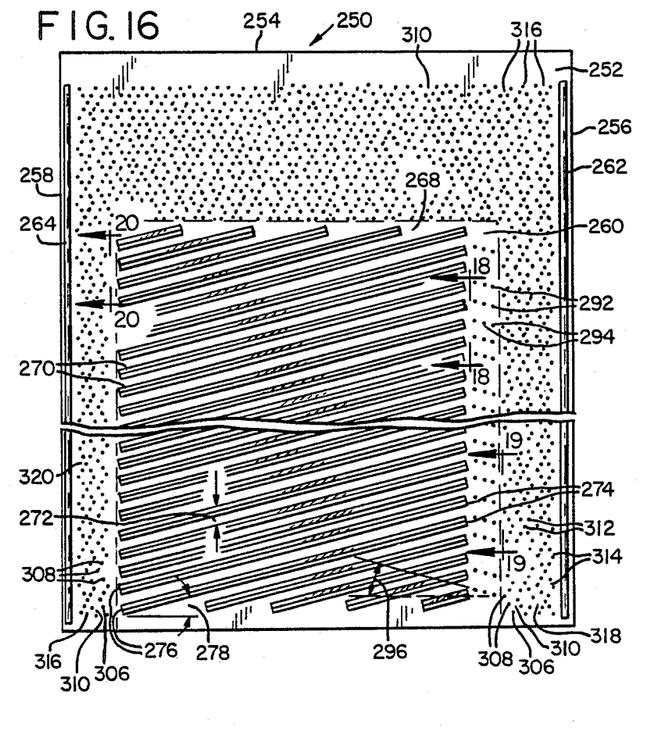
FIG. 16 is a view similar to that of FIG. 2 showing a right flap which is an additional embodiment of the invention.

Raised ribs 262 and 264 project forward from the vertical margins 256 and 258, respectively, and are similar to the ribs 39 of the flap 12. The rib 264 may have a height 266 of about ¾ inch, for example, while the rib 262 is preferably 1½ inch high and somewhat thicker, to provide increased stiffness of the flap 250 along the laterally inward vertical margin 256.

A spray-suppressing first area 268 corresponds generally with the first area 40 of the flap 12, and includes a group of parallel, laterally-extending and sloping, forwardly-projecting bars 270 molded integrally with the base sheet 252. The bars 270 extend laterally over a majority of the width of the flap 250, and corresponding parts of adjacent ones of the bars 270 are separated vertically along the face of the flap by a spacing 272 which is preferably about 0.75 inch (1.9 cm), although a spacing 272 in the range of 0.5 inch to 1.0 inch (1.3-2.5 cm) could be used. As shown best in FIG. 16, each bar 270 slopes downward along the base surface 260 from an upper end 274 located nearer the vertical margin 256, toward a lower end 276, located nearer the vertical margin 258. The lateral slope of the bars 270 defines an angle 278 with respect to the horizontal which is in the range from 10° to 20° and preferably 14° to 16°, when the flap 250 is suspended in the usual orientation in which the margins 256 and 258 are vertical.

Figure 18:
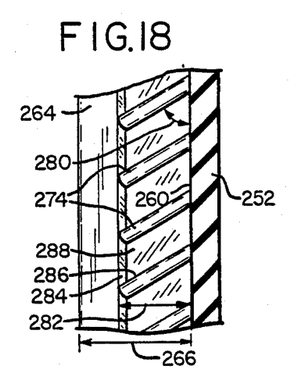
FIG. 18 is a sectional profile view, at an enlarged scale, taken along line 18—18 of FIG. 16, showing the sloping bars which form a portion of the spray-suppressant flap of FIG. 16.

Each of the bars 270 projects forwardly away from the base surface 260 and slopes downardly, forming an interior angle 280 between the bottom side of the rib 270 and the general plane of the base surface 260 as seen in a vertical plane and shown in FIG. 18. The angle 280 is in the range from 60° to 70° and preferably is about 66°.

Preferably, each of the bars 270 projects fowardly away from the base surface 260 by a bar height 282 which may, for example, be about one-half inch (1.27 cm) and each bar 270 has a bar margin 284, a top surface 286, and a bottom surface 288. The top and bottom surfaces 286 and 288 are preferably parallel with each other, while the bar margin 284 is perpendicular to the top and bottom surfaces 286 and 288.

Aligned with the upper end 274 of each of the bars 270 is a laterally inwardly and downwardly sloping row 292 of forwardly projecting fingers 294 generally similar to the fingers 46, the rows 292 being similar to the rows 190 shown in FIG. 13. Each row 292 extends slopingly downwardly toward the laterally inward vertical margin 256, at an angle 296 with respect to the horizontal. The angle 296 may, for example, be in the range from 15°-20°, and is preferably about 18°. Each row 292 includes two or three fingers 294, with the use of three fingers being preferred when the length of the bars 270 is greater than, for example, about 12 inches (30.5 cm).

Figure 19:
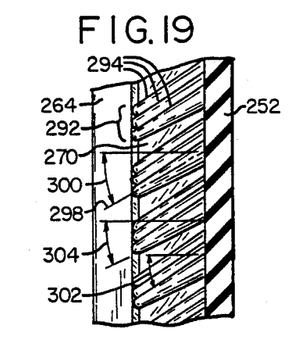
FIG. 19 is a sectional profile view, at an enlarged scale, taken along line 19—19 of FIG. 16, showing another portion of the spray-suppressant flap.
Figure 20:
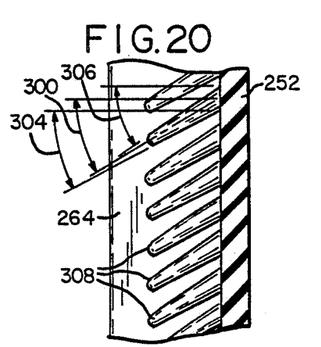
FIG. 20 is a sectional profile view, at an enlarged scale, taken along line 20—20, of another portion of the spray-suppressant flap shown in FIG. 16.

The locations of individual fingers 294 in different the several rows 292 correspond with one another, so that corresponding fingers 294 are aligned vertically with one another, as described previously with respect to the fingers 192 on the flap 150. Each of the fingers 294 projects forward from the base surface 260 and is inclined downwardly, so that a central axis 298 of each finger 294 defines an angle 300 of about 24° with respect to a perpendicular to the base surface 260, as shown in FIG. 19. Each of the fingers 294 is preferably similar to the fingers 46, except for the generally downward slope with respect to the base surface 260, defining angles 302 and 304, of about 18° and 30°, respectively, between uppermost and lowermost surfaces of each finger 294 and respective perpendiculars to the base surface 260, depepending on the angle 300.

A zig-zag, vertically oriented row 306 of forwardly-extending flexible fingers 308, which are essentially similar to the fingers 294, is located along the ends of the rows 292 nearer the inner vertical margin 256, but separated from the ends of the rows 292 by a distance great enough to serve as a vertical channel 310 which is free from significant protrusions from the base surface 260. The fingers 308 preferably are spaced apart from one another by a distance of ¼ inch (0.6 cm), between corresponding parts of adjacent fingers 308.

Spaced laterally toward the inner vertical margin 256 from the zig-zag row 306, within a spray-suppressing second area 310 of the base sheet 252 (corresponding with a portion of the second area 44 of the flap 12) are a plurality of forwardly-extending flexible fingers 312, also essentially similar to the fingers 294, arranged in a pattern of a plurality of rhombic groups 314 similar to the rhombic groups 48 of the flap 12. The groups 314 are arranged in parallel, generally vertical, rows 316 with laterally adjacent vertical rows 316 being offset vertically from one another to form a zig-zag channel 318 similar to the channels 214 of the flap 150, extending generally vertically along the base surface 260 so as to conduct a flow of liquid downwardly along the base surface 260 within the spray-suppressant second area 310. The spray-suppressant second area 310 also extends across the upper marginal portion of the flap 250.

A spray-suppressant third area 320 of the flap 250 is located extending generally vertically along the laterally outer margin of the flap 250, between the rib 264 and the lower ends 276 of the sloping spray-suppressant bars 270. The third area 320 includes at least one row 316 of rhombic groups 314 of fingers 312, and when more than one row 316 is provided, laterally adjacent rows 316 are offset vertically from one another so as to define zig-zag channels 318 between adjacent ones of the rows 316, as in the second area 310. A single, generally vertical zig-zag row 306 of fingers 308 located along the lower ends 276 defines a zig-zag channel 310 between the row 306 and the adjacent row 316 in the area 320.

While the flap 250 might be constructed similarly to the flap 150, including a replaceable lower portion (not shown), it is contemplated that for economy of manufacture to provide spray-suppressant flaps according to the present invention for various sizes of vehicles, the flap 250 may be manufactured with the first spray-suppressant area 268 extending over the base sheet 252 the entire way from the portion of the area 310 along the top margin 254 to the lower margin 322, and each flap 250 or 251 can be cut to the required length.

The flap 250 described in the preceding paragraphs performs similarly to the flap 150, but has the capacity for yet superior suppression of spray by virtue of the forward and downward inclination of the bars 270, which tends to trap spray beneath the bars 270, and by virtue of the downward and laterally outward slope of the bars 270 along the base sheet 252, which tends to divert streams of spray which have impinged upon and collected between the bars 270, leading such fluid to flow laterally downwardly and outwardly between the bars 270, away from the spray-suppressant first area 268 and is deflected downward by the fingers 308 and 312 into the channels 318 located adjacent the generally vertical inner and outer marginal areas 256 and 258 of the flap 250.

Figure 17:
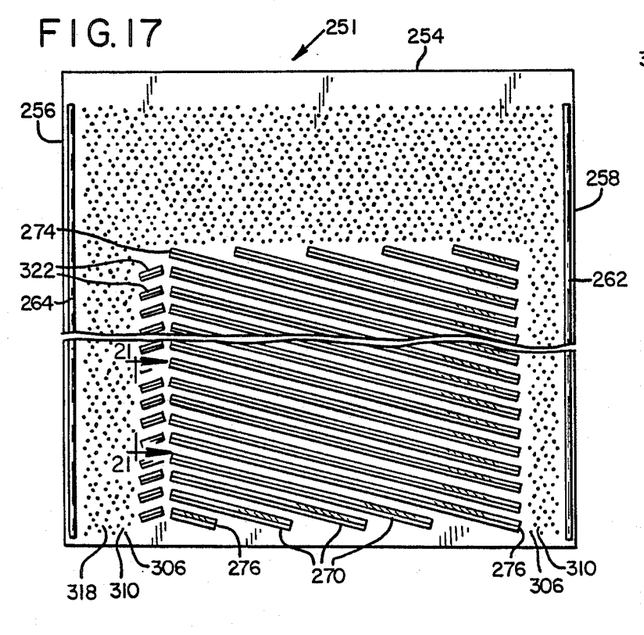
FIG. 17 is a view similar to that of FIG. 2 showing a left flap which is yet a further embodiment of the present invention.
Figure 21:
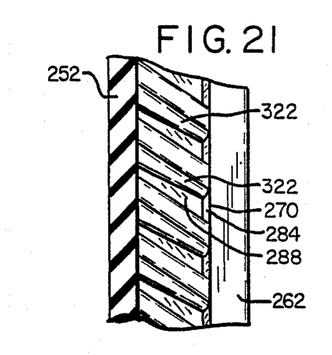
FIG. 21 is a sectional profile view, at an enlarged scale, taken along line 21—21 of the spray-suppressant flap shown in FIG. 17.

As shown in FIGS. 17 and 21, a flap 251 includes flow diverter bars 322 similar to the diverter members 106 shown in FIG. 9, instead of the rows 292 of fingers 294. Such diverter bars 322, as the rows 292, are sloped toward the laterally inward margin 256 by an angle of about 18° to the horizontal, and project forward from the base surface 260 with a downward inclination of about 24° below the horizontal. Each diverter bar 322 is about as long along the face of the flap 251 as the equivalent row 292 of a flap 250, or, for example, about 1 or 2 inches long, although the length of the diverter bar 322 is not critical, so long as it effectively serves the purpose of slowing any flow of fluid upwardly along the slope of the bars 270, to direct the flow to a downward direction in an area of the flap 251 which is not directly behind the wheels of a vehicle.

Figure 14:
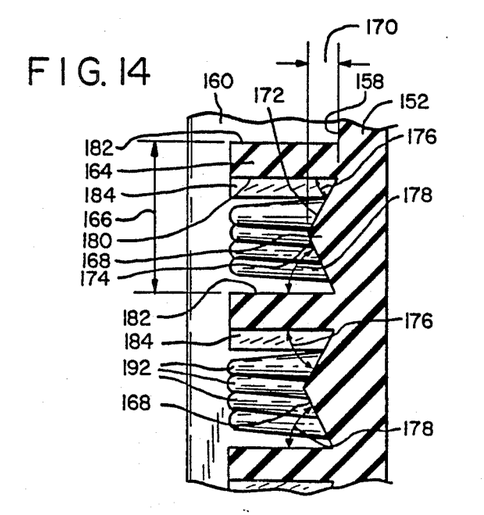
FIG. 14 is a sectional view of a portion of the flap shown in FIG. 12, taken along line 14—14, at an enlarged scale.
Figure 15:
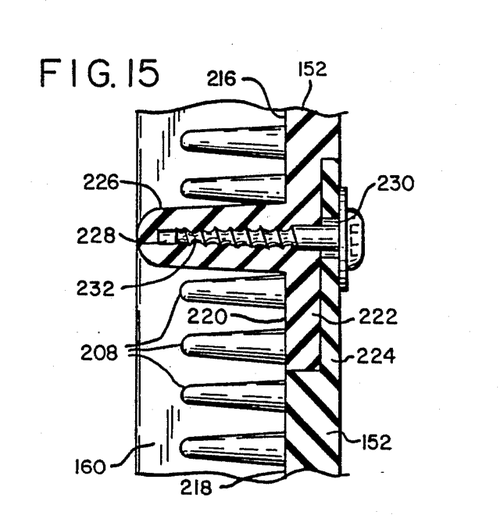
FIG. 15 is a sectional view of a portion of the flap shown in FIG. 12, taken along line 15—15, at an enlarged scale.

Additionally, in the flaps 250 and 251, shown respectively in FIGS. 16 and 17, ridges 168 similar to those shown in FIGS. 12, 13, and 14 may be provided along the planar base surface 260, between the forwardly projecting bars 270. A single ridge 168 can be provided in each space between adjacent ones of the bars 270 in the same manner in which the ridges 168 are provided and shown between the bars 164, shown in FIGS. 12, 13, and 14. Such forwardly projecting ridges 168 if provided project forward a significantly smaller distance than do the bars 270, and extend laterally along the base surface 260 over a distance of more than half the length of the bars 270, and preferbly greater than one-third of the width of the flap 250 or 251. Each ridge 168, as shown in FIGS. 12, 13, and 14 previously described, preferably projects foward from the base surface a distance and is centrally located between the respective ones of the bars 270 immediately above and below. As previously described in connection with FIGS. 12-14, the sloping surfaces of the ridges 168 when present form respective interior angles with respect to the bottom surface and top surface of adjacent bars 270, the interior angles preferably being within the range of 41 degrees-90 degrees, between respective forwardly projecting top and bottom surfaces of adjacent bars and the sloped surfaces of the ridges, and preferably at least one of the interior angles between each ridge and an adjacent top or bottom surface of an adjacent one of the forwardly projecting bars is approximately 72 degrees.

Preferably each of the sloping forwardly projecting laterally extending bars 270 includes a central portion and a pair of opposite end portions which extend laterally outward beyond the ridges 168 by a distance at least as great as the vertical distance between vertically adjacent ones of the forwardly-projecting bars 270.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A spray-suppressant flap for use behind the wheels of a highway vehicle for limiting the amount of spray thrown into the air by operation of such a vehicle on a wet roadway, comprising:
    (a) an imperforate base member defining a generally planar base surface limited by a top and a bottom, a laterally inner marginal portion and a laterally outer marginal portion, said marginal portions extending vertically and defining a width of said flap;
    (b) a plurality of substantially parallel and straight bars located only on a first area of said base surface, each of said bars projecting fowardly and sloping downwardly from said base member and extending along said base member slopingly from an upper end located nearer said laterally inner marginal portion toward a lower end located nearer said laterally outer marginal portion; and
    (c) a plurality of spray-suppressant members projecting forwardly from said base surface in a second area of said base surface located adjacent said first area thereof, said spray-suppressant members in said second area defining a plurality of generally vertical channels, and the portions of said base surface within said channels and between said bars in said first area being free from said spray-suppressant members.

2. The spray-suppressant flap of claim 1 wherein said bars slope downwardly along their lateral extent along said base suface at an angle to the horizontal in the range of 10° to 20°.

3. The spray-suppressant flap of claim 1 wherein said bars project forwardly and downwardly at an angle in the range of 20° to 30° below the horizontal when said flap is hanging vertically.

4. The spray-suppressant flap of claim 3 wherein said bars slope downwardly along their lateral extent along said base surface at an angle to the horizontal in the range of 10° to 20°.

5. The spray-suppressant flap of claim 4 wherein said spray-suppressant members comprise generally parallel elongate flexible fingers, each said finger having a base and a central axis and having length at least about 2½ times as great as its maximum thickness, said fingers being located on and distributed over said base surface, so as to present additional surface area in the paths of fluid droplets traveling toward said spray-suppressant material, each of said fingers extending from said base surface, said plurality of fingers being arranged in a plurality of rhombic groups, said rhombic groups being arranged in parallel rows defining said generally vertical zig-zag channels between said rows.

6. The spray-suppressant flap of claim 5, including a plurality of forwardly projecting, laterally-extending ridges located on said first area of said base surface, between said laterally-extending bars, and parallel thereto.

7. The spray-suppressant flap of claim 6 wherein each of said ridges is centrally located between a pair of said substantially parallel, laterally-extending bars, and protrudes forward a distance substantially less than that by which said laterally-extending bars project forward.

8. The spray-suppressant flap of claim 7 wherein each of said ridges includes a pair of sloped surfaces and each of said laterally-extending bars includes respective forwardly projecting top and bottom surfaces, said sloped surfaces and said forwardly projecting top and bottom surfaces defining respective interior angles in the range of 41°–90°.

9. The spray-suppressant flap of claim 8 wherein the size of at least one of said interior angles is approximately 72°.

10. The spray-suppressant flap of claim 1 wherein said spray-suppressant members include a plurality of diverter bars extending slopingly along the face of said base surface with a slope opposite that of said bars, the length of each of said diverter bars being about 1 inch.

11. A spray-suppressant flap for use behind the wheels of a highway vehicle for limiting the amount of spray thrown into the air by operation of such a vehicle on a wet roadway, comprising:
(a) an imperforate base member defining a generally planar base surface limited by a top, a bottom, a laterally inner marginal portion and a laterally outer marginal portion, said marginal portions extending vertically and defining a width of said flap;
(b) a plurality of substantially parallel bars located on a first area of said base surface, each of said bars projecting forwardly and slopingly downwardly from said base member, at an angle in the range of 20 degrees to 30 degrees below the horizontal when said flap is hanging vertically, and extending along said base member slopingly from an upper end located nearer said laterally inner marginal portion toward a lower end located nearer said laterally outer marginal portion at an angle to the horizontal in the range of 10 degrees to 20 degrees; and
(c) a plurality of spray-suppressant members projecting forwardly from said base surface in a second area of said base surface located adjacent said first area thereof, said spray-suppressant members comprising generally parallel elongate flexible fingers extending from said base surface, each said finger having a base and a central axis and having a length at least about 2½ times as great as its maximum thickness, said fingers being located on and distributed over said base surface, so as to present additional surface area in the paths of fluid droplets traveling toward said spray-suppressant flap, said spray-suppressant members in said second area including a plurality of fingers arranged in a plurality of rhombic groups, said rhombic groups being arranged in parallel rows defining generally vertical zig-zag channels between said rows, and said base surface within said channels being free from said spray suppressant members; and
(d) a plurality of forwardly projecting, laterally extending ridges defined on said first area of said base surface, between said laterally extending bars and parallel thereto, each of said forwardly projecting laterally extending bars including a central portion and a pair of opposite end portions which extend laterally outward beyond said ridges.

12. The spray-suppressant flap of claim 11 wherein said central portion and said ridges extend laterally a distance at least equal to one third of the width of said flap and said bars extend laterally a distance at least equal to a majority of the width of said flap, and said opposite end portions of said bars extend beyond said ridges a distance at least equal to the distance between vertically adjacent ones of said bars.

13. A spray-suppressant flap for use behind the wheels of a highway vehicle for limiting the amount of spray thrown into the air by operation of such a vehicle on a wet roadway, comprising:
(a) an imperforate base member defining a generally planar base surface limited by a top, a bottom, a laterally inner marginal portion and a laterally outer marginal portion, said marginal portions extending vertically and defining a width of said flap;
(b) a plurality of substantially parallel bars located on a first area of said base surface, each of said bars projecting forwardly and sloping downwardly from said base member, at an angle in the range of 20 degrees to 30 degrees below the horizontal when said flap is hanging vertically, and extending along said base member slopingly from an upper end located nearer said laterally inner marginal portion toward a lower end located nearer said laterally outer marginal portion at an angle to the horizontal in the range of 10 degrees to 20 degrees; and
(c) a plurality of spray-suppressant members projecting forwardly from said base surface in a second area of said base surface located adjacent said first area thereof, said spray-suppressant members comprising generally parallel elongate flexible fingers extending from said base surface, each said finger having a base and a central axis and having a length at least about 2½ times as great as its maximum thickness, said fingers being located on and distributed over said base surface, so as to present additional surface area in the paths of fluid droplets traveling toward said spray-suppressant flap, said spray-suppressant members in said second area including a plurality of fingers arranged in a plurality of rhombic groups, said rhombic groups being arranged in parallel rows defining generally vertical zig-zag channels between said rows, and said base surface within said channels being free from said spray suppressant members;
(d) a plurality of forwardly projecting, laterally extending ridges defined on said first area of said base surface, between said laterally extending bars, and parallel thereto; and (e) a plurality of laterally outwardly and downwardly sloping rows of said generally parallel elongate flexible fingers, located on said imperforate base member, said rows extending laterally along said base member between respective ones of said parallel fowardly projecting, laterally-extending bars and said second area of said base surface, and each of said fingers of said rows projecting forwardly and slopingly downward.

14. The spray-suppressant flap of claim 13 wherein the individual flexible fingers of each of said outwardly and downwardly sloping rows are located in vertical alignment with corresponding ones of the fingers of other ones of said laterally outwardly and downwardly sloping rows, defining generally vertical straight channels on said base surface, between said laterally-extending bars and said second area.

15. The spray-suppressant flap of claim 13, including a generally vertically aligned zig-zag row of said parallel elongate flexible fingers, apart from said rhombic groups, located on said base surface and defining a generally vertical zig-zag channel between said outwardly and downwardly sloping rows of forwardly-extending fingers and a closest one of said parallel rows of rhombic groups.

16. The spray-suppressant flap of claim 15 wherein the ones of said forwardly-extending fingers in each of said outwardly and downwardly sloping rows are spaced apart from one another a distance greater than the distance between adjacent ones of said plurality of fingers arranged as each of said rhombic groups.

17. A spray-suppressant flap for use behind the wheels of a highway vehicle for limiting the amount of spray thrown into the air by operation of such a vehicle on a wet roadway, comprising:

(a) an imperforate base member defining a generally planar base surface limited by a top, a bottom, a laterally inner marginal portion and a laterally outer marginal portion, said marginal portions extending vertically and defining a width of said flap;

(b) a plurality of substantially parallel bars located on a first area of said base surface, each of said bars projecting forwardly and sloping downwardly from said base member, at an angle in the range of 20 degrees to 30 degrees below the horizontal when said flap is hanging vertically, and extending along said base member slopingly from an upper end located nearer said laterally inner marginal portion toward a lower end located nearer said laterally outer marginal portion at an angle to the horizontal in the range of 10 degrees to 20 degrees;

(c) a plurality of spray-suppressant members projecting forwardly from said base surface in a second area of said base surface located adjacent said first area thereof, said spray-suppressant members comprising generally parallel elongate flexible fingers extending from said base surface, each said finger having a base and a central axis and having a length at least about $2\frac{1}{2}$ times as great as its maximum thickness, said fingers being located on and distributed over said base surface, so as to present additional surface area in the paths of fluid droplets traveling toward said spray-suppressant flap, said spray-suppressant members in said second area including a plurality of fingers arranged in a plurality of rhombic groups, said rhombic groups being arranged in parallel rows defining generally vertical zig-zag channels between said rows, and said base surface within said channels being free from said spray suppressant members;

(d) a plurality of forwardly projecting, laterally extending ridges defined on said first area of said base surface, between said laterally extending bars, and parallel thereto;

(e) each of said substantially parallel forwardly projecting laterally extending bars including a central portion and a pair of opposite end portions which extend laterally along said base surface beyond said ridges; and (f) a plurality of outwardly and downwardly sloping rows of said elongate flexible fingers, each said row extending between an end of a respective one of said parallel forwardly projecting, laterally extending bars and said second area of said base surface.

18. The spray-suppressant flap of claim 17, including a generally vertically aligned zig-zag row of said parallel elongate flexible fingers, apart from said rhombic groups and defining a generally vertical zig-zag channel between said outwardly and downwardly sloping rows of forwardly-extending fingers and a closest one of said parallel rows of rhombic groups.

* * * * *